(12) United States Patent
Kim et al.

(10) Patent No.: US 7,607,466 B2
(45) Date of Patent: Oct. 27, 2009

(54) SELF-SEALING TIRE

(76) Inventors: Daniel Kim, 3106 Midvale Ave., Los Angeles, CA (US) 90034; Alex Kim, 3106 Midvale Ave., Los Angeles, CA (US) 90034

( * ) Notice: Subject to any disclaimer, the term of this patent is extended or adjusted under 35 U.S.C. 154(b) by 7 days.

(21) Appl. No.: 11/588,581

(22) Filed: Oct. 27, 2006

(65) Prior Publication Data

US 2008/0099119 A1    May 1, 2008

(51) Int. Cl.
*B60C 5/12* (2006.01)
*B60C 5/14* (2006.01)

(52) U.S. Cl. .................. 152/502; 152/504; 152/505
(58) Field of Classification Search ........... 152/505, 152/339.1
See application file for complete search history.

(56) References Cited

U.S. PATENT DOCUMENTS 2,877,819 A * 3/1959 Gibbs .................... 152/505

2008/0156408 A1 * 7/2008 Sekiguchi et al. ........... 152/504

FOREIGN PATENT DOCUMENTS

| DE | 19839911 | * | 3/2000 |
| EP | 1688239 | * | 8/2006 |
| JP | 4-368203 | * | 12/1992 |
| JP | 2003-334868 | * | 11/2003 |
| JP | 2006-248435 | * | 9/2006 |

* cited by examiner

*Primary Examiner*—Justin Fischer
(74) *Attorney, Agent, or Firm*—John K. Park; Park Law Firm

(57) ABSTRACT

A self-sealing tire includes a tire body, a partition wall, and a sealant that is adapted to seal a puncture in the tire body. The tire body includes an outer circumferential wall that contacts the ground, a first side wall and a second side wall that extend from the outer circumferential wall. The partition wall is provided between the first side wall and the second side wall and defines a partitioned space between the outer circumferential wall, the first side wall, the second side wall and the partition wall. The sealant is filled in the partitioned space. The partition wall includes a partition membrane, and dividing projections that are protruded from the partition membrane. Air is exhausted from the partitioned space and the sealant is filled into the partitioned space.

3 Claims, 4 Drawing Sheets

SELF-SEALING TIRE

BACKGROUND OF THE INVENTION

The present invention relates to a self-sealing tire. More particularly, this invention relates to a self-sealing tire that provides uniform distribution of sealant, which temporarily cures puncture of the tire, inside the tire. Pneumatic tires are widely used due to their excellent shock absorbing property and riding comfort. Pneumatic tires are prone to puncture since they are inherently made of soft and flexible material including rubber. When puncture occurs due to sharp objects on the road such as nails, the high pressure air inside the tire leaks and the pneumatic tire cannot function properly.

Many methods and devices have been developed to temporarily or permanently cure punctures to prevent stopping of an automobile and risks due to sudden failure of the tire.

A semi-liquid seal that covers the inside surface of the tire and forms an air-tight film when puncture occurs was developed.

The disadvantage of the semi-liquid seal is that gravitational flow occurs when an automobile is parked, and the seal moves down to the bottom of the tire. As a result, vibration of tire due to unbalance of the tire occurs.

SUMMARY OF THE INVENTION

The present invention contrives to solve the disadvantages of the prior art.

An objective of the invention is to provide a self-seal tire that keeps balanced state.

Another objective of the invention is to provide a self-seal tire that provides two-tier protection against puncture.

Still another objective of the invention is to provide a self-seal tire that can be completed in a manufacturing plant.

In order to achieve the above objectives, the present invention provides a self-sealing tire that includes a tire body that is made of flexible and airtight material and is adapted to be assembled with a rim, a partition wall, and a sealant that is adapted to seal a puncture in the tire body.

The tire body has a circular shape, and includes a outer circumferential wall that is adapted to contact the ground, a first side wall and a second side wall that extend from the outer circumferential wall. The partition wall is provided between the first side wall and the second side wall and defines a partitioned space between the outer circumferential wall, the first side wall, the second side wall and the partition wall. The sealant is filled in the partitioned space.

The sealant has a high viscosity.

The partition wall includes a partition membrane. The partition membrane includes a first edge that contacts the first side wall, and a second edge that contacts the second side wall. The first edge and the second edge are fixed to the first side wall and the second side wall with adhesive.

The partition membrane forms an annulus that is concentric with the tire body.

The partition wall further includes one or more dividing projections that are protruded from the partition membrane. Preferably, the diving projections and the partition membrane are integrally made.

The dividing projections contact with the outer circumferential wall of the tire body.

Each of the dividing projections forms an annulus that is concentric with the tire body.

The dividing projection includes one or more communication holes so that the sealant may flow through the communication holes.

The partition wall further includes an air exhaust conduit and a sealant injection conduit. The sealant injection conduit includes a flange, and the diameter of the sealant injection conduit increases from the flange toward the free end of the sealant injection conduit.

The air exhaust conduit comprises a flange and a neck portion. The diameter of the air exhaust conduit decreases from the neck portion toward the free end of the air exhaust conduit.

Air is exhausted from the partitioned space through the air exhaust conduit and the sealant is injected through the sealant injection conduit. The air exhaust conduit and the sealant injection conduit are cut after the sealant fills the partitioned space, and a pad seals the cut air exhaust conduit and the sealant injection conduit.

The partition wall further includes a metal partition reinforce member that is provided adjacent to the partition membrane.

The metal partition reinforce member has a shape of a plate.

The advantages of the present invention are: (1) the self-seal tire prevents gravitational flow of the sealant and thereby keeps balance of the tire; (2) the self-seal tire provides multi-tier protection that increases safety and convenience against puncture; (3) the sealant is injected into the self-seal tire without requiring the self-seal tire to be assembled to a rim thereby eliminating the need of special facility when the tire is assembled to the rim.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
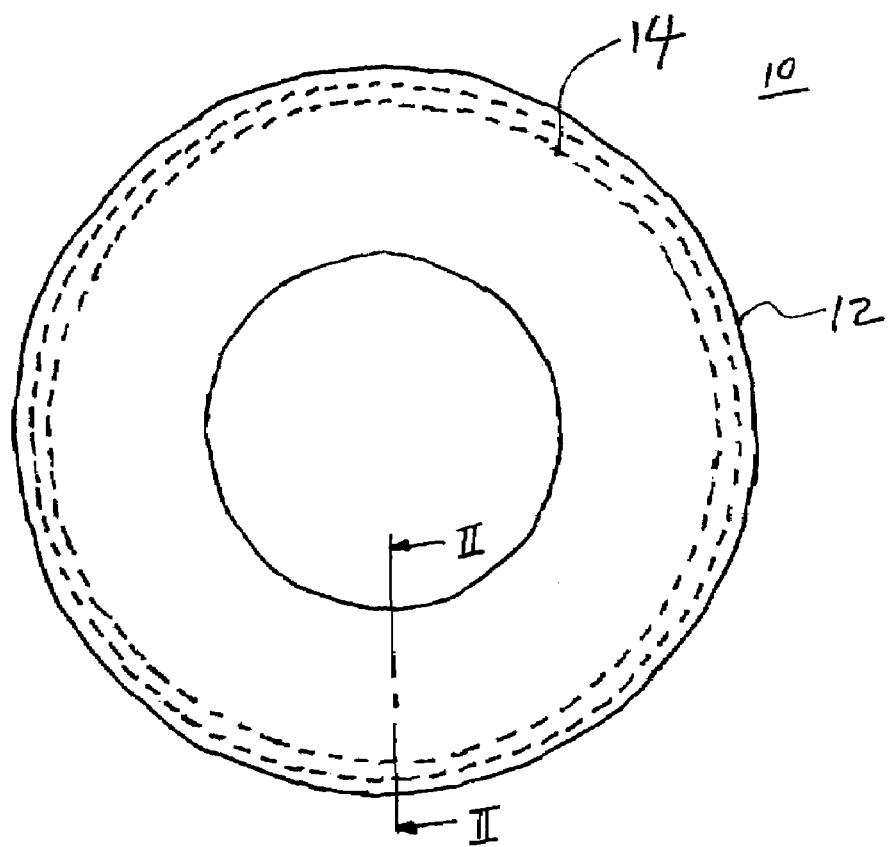
FIG. 1 is an elevation view showing a self-seal tire according to the present invention.
Figure 2:
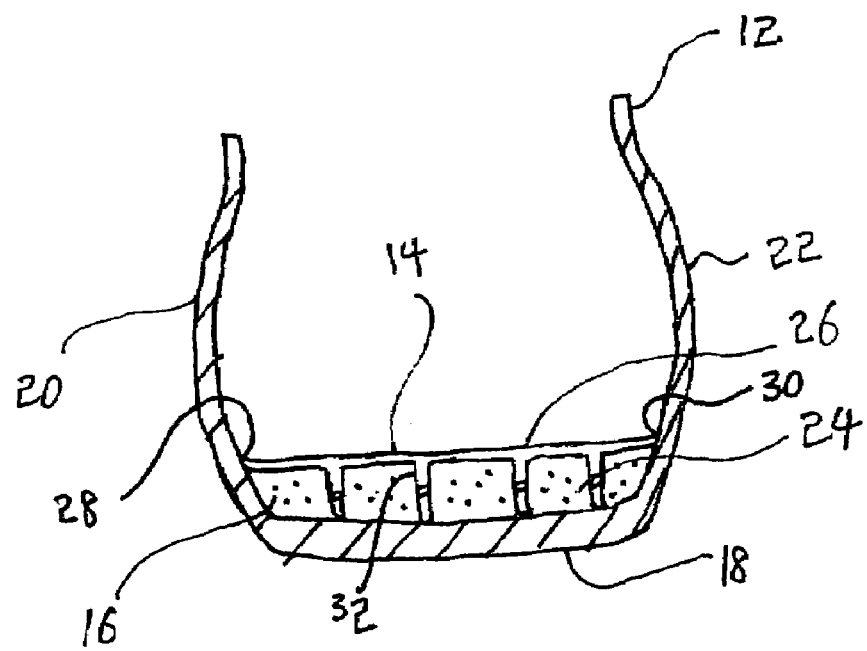
FIG. 2 is a cross-sectional view taken along line II-II in FIG. 1.

FIGS. 1 and 2 show a self-sealing tire 10 that includes a tire body 12 that is made of flexible and airtight material and is adapted to be assembled with a rim, a partition wall 14, and a sealant 16 that is adapted to seal a puncture in the tire body 12.

The tire body 12 has a circular shape, and includes an outer circumferential wall 18 that is adapted to contact the ground, a first side wall 20 and a second side wall 22 that extend from the outer circumferential wall 18. The partition wall 14 is provided between the first side wall 20 and the second side wall 22 and defines a partitioned space 24 between the outer circumferential wall 18, the first side wall 20, the second side wall 22 and the partition wall 14. The sealant 16 is filled in the partitioned space 24.

The sealant 16 has a high viscosity.

The partition wall 14 includes a partition membrane 26. The partition membrane 26 includes a first edge 28 that contacts the first side wall 20, and a second edge 30 that contacts the second side wall 22. The first edge 28 and the second edge 30 are fixed to the first side wall 20 and the second side wall 22 with adhesive 44.

The partition membrane 26 forms an annulus that is concentric with the tire body 12.

Figure 3:
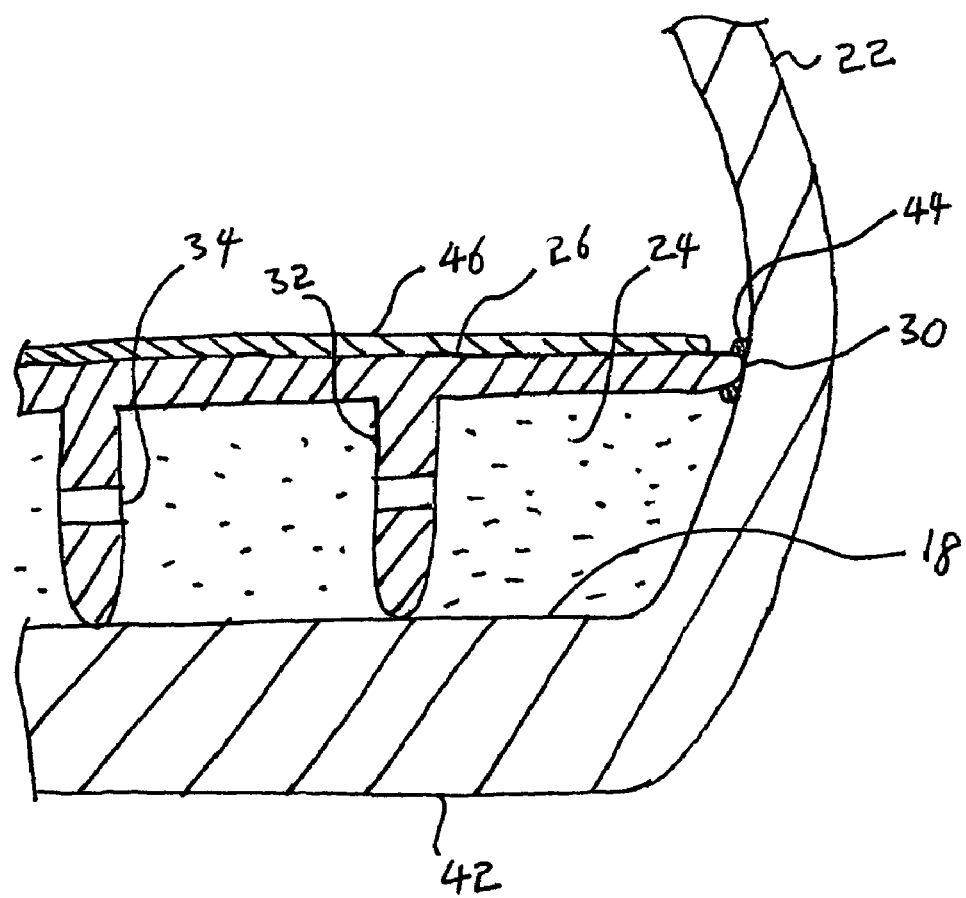
FIG. 3 is an enlarged cross-sectional view of a tire body and a partition wall.

As shown well in FIG. 3, the partition wall 14 further includes one or more dividing projections 32 that are protruded from the partition membrane 26. The dividing projections facilitate the partition membrane 26 to be spaced at a predetermined distance from the outer circumferential wall 18.

The dividing projections 32 contact with the outer circumferential wall 18 of the tire body 12.

Each of the dividing projections 32 forms an annulus that is concentric with the tire body 12.

The dividing projection 32 includes one or more communication holes 34 so that the sealant 16 may flow through the communication holes 34.

Figure 4:
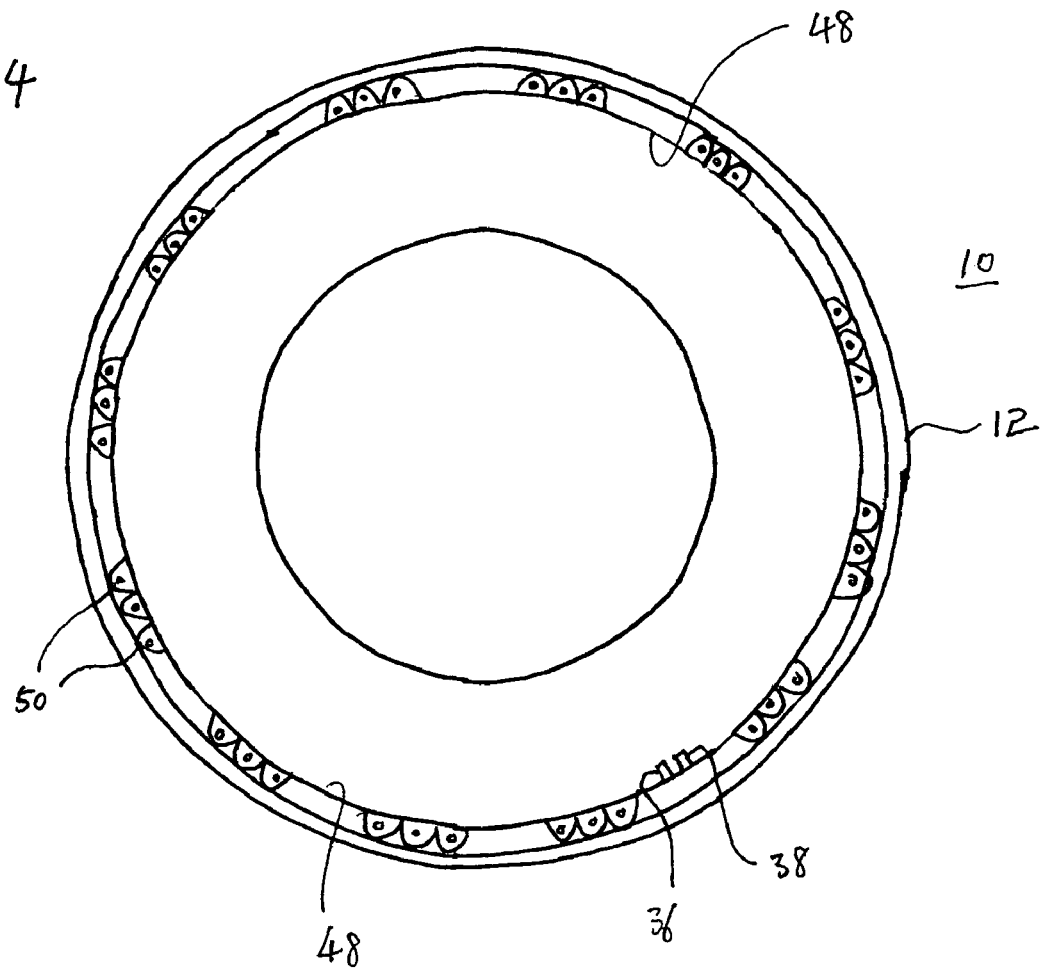
FIG. 4 is a cross-sectional view of the self-seal tire.

As shown in FIG. 4, the partition wall 14 further includes an air exhaust conduit 36 and a sealant injection conduit 38.

Figure 6:
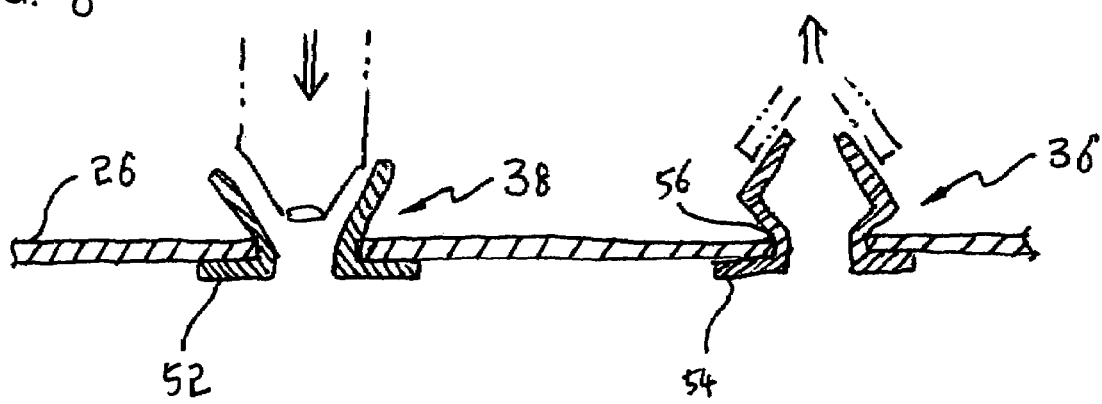
FIG. 6 is a cross-sectional view showing an air exhaust conduit and a sealant injection conduit.

As shown in FIG. 6, the air exhaust conduit 36 comprises a flange 54 and a neck portion 56. The diameter of the air exhaust conduit 36 decreases from the neck portion 56 toward the free end of the air exhaust conduit. This construction facilitates vacuuming inside the partitioned space 24 through a suction nozzle and cutting of the air exhaust conduit 36.

The sealant injection conduit 38 includes a flange 52, and the diameter of the sealant injection conduit 38 increases from the flange toward the free end thereof. This construction facilitates sealant injection through an injection nozzle and cutting of the sealant injection conduit 38.

Figure 5:
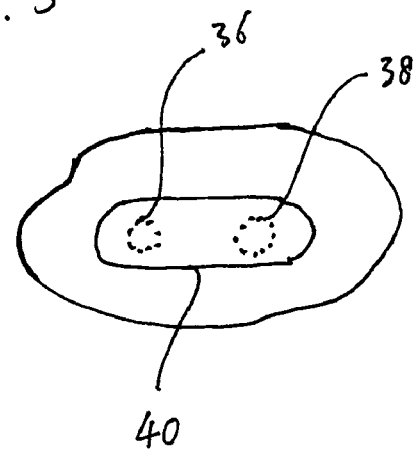
FIG. 5 is a partial plan view of the partition wall.

Air is exhausted from the partitioned space 24 through the air exhaust conduit 36 and the sealant 16 is injected through the sealant injection conduit 38 by the negative pressure generated with the suction nozzle. The air exhaust conduit 36 and the sealant injection conduit 38 are cut after the sealant 16 fills the partitioned space 24, and a pad 40 seals the cut air exhaust conduit 36 and the sealant injection conduit 38 as shown in FIG. 5.

Referring back to FIG. 3, the outer circumferential wall 18 includes a rubber tire wall 42.

The partition wall 14 further includes a metal partition reinforce member 46 that is adjacent to the partition membrane 26, and fixed to the partition membrane 26.

The metal partition reinforce member 46 has a shape of a plate. The metal reinforce members provide further protection against puncture.

Dividing projection 50 may be provided as separated pieces as shown in FIG. 4.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A self-sealing tire comprising:
a) a tire body that is made of flexible and airtight material and is adapted to be assembled with a rim;
b) a partition wall; and
c) a sealant that is adapted to seal a puncture in the tire body;
wherein the tire body has a circular shape, and comprises a outer circumferential wall that is adapted to contact the ground, a first side wall and a second side wall that extend from the outer circumferential wall, wherein the partition wall is provided between the first side wall and the second side wall and defines a partitioned space between the outer circumferential wall, the first side wall, the second side wall and the partition wall, wherein the sealant is filled in the partitioned space,
wherein the partition wall comprises a partition membrane,
wherein the partition membrane comprises a first edge that contacts the first side wall, and a second edge that contacts the second side wall, wherein the partition membrane forms an annulus that is concentric with the tire body,
wherein the partition wall further comprises one or more dividing projections that are protruded from the partition membrane,
wherein the dividing projections of the partition wall contact with the outer circumferential wall of the tire body,
wherein each of the dividing projections forms an annulus that is concentric with the tire body,
wherein the dividing projection comprises one or more communication holes whereby the sealant may flow through the communication holes.

2. A self-sealing tire comprising:
a) tire body that is made of flexible and airtight material and is adapted to be assembled with a rim;
b) a partition wall; and
c) a sealant that is adapted to seal a puncture in the tire body;
wherein the tire body has a circular shape, and comprises a outer circumferential wall that is adapted to contact the ground, a first side wall and a second side wall that extend from the outer circumferential wall, wherein the partition wall is provided between the first side wall and the second side wall and defines a partitioned space between the outer circumferential wall, the first side wall, the second side wall and the partition wall, wherein the sealant is filled in the partitioned space,
wherein the partition wall comprises a partition membrane,
wherein the partition membrane comprises a first edge that contacts the first side wall, and a second edge that contacts the second side wall, wherein the partition membrane forms an annulus that is concentric with the tire body,
wherein the partition wall further comprises a metal partition reinforce member that is provided adjacent to the partition membrane.

3. The self-sealing tire of claim 2, wherein the metal partition reinforce member has a shape of a plate.

* * * * *